United States Patent [19]
Goto et al.

[11] Patent Number: 5,991,509
[45] Date of Patent: Nov. 23, 1999

[54] TEMPERATURE ADJUSTING SYSTEM ADAPTED FOR USE IN AN ELECTRIC VEHICLE AND THE LIKE

[75] Inventors: Naomi Goto; Yasufumi Kurahashi, both of Otsu, Japan

[73] Assignee: Matsushita Electric Industrial Co., Ltd., Osaka-fu, Japan

[21] Appl. No.: 08/906,331

[22] Filed: Aug. 5, 1997

[30] Foreign Application Priority Data

Aug. 30, 1996 [JP] Japan ................................ 8-230037

[51] Int. Cl.⁶ .................................................. A47J 27/00
[52] U.S. Cl. ........................................ 392/441; 392/456
[58] Field of Search ................................. 219/202, 494;
392/441, 456, 451, 454, 449, 485, 488;
165/41–44

[56] References Cited

U.S. PATENT DOCUMENTS

| | | | |
|---|---|---|---|
| 4,192,992 | 3/1980 | Stevens | 219/494 |
| 4,588,875 | 5/1986 | Kozak | 219/485 |
| 4,591,691 | 5/1986 | Badali | 219/202 |
| 5,125,068 | 6/1992 | McNair | 392/441 |
| 5,675,485 | 10/1997 | Seong | 363/97 |
| 5,730,098 | 3/1998 | Sasaki | 123/198 |

*Primary Examiner*—Teresa Walberg
*Assistant Examiner*—Thor S. Campbell
*Attorney, Agent, or Firm*—Wenderoth, Lind & Ponack, L.L.P.

[57] ABSTRACT

In an air heating system for use in an electric vehicle and the like, a heat-transfer fluid supply apparatus includes, a thermo-control circuit (TCCRT) having a thermo-control valve, a fluid-heating circuit (HCRT) having a high DC voltage battery for supplying a high DC voltage to an electric heater, and a switch control unit operatively associated with both the thermo-control circuit and the fluid-heating circuit, where the switch control unit includes a semiconductor device which is operative by variations in electric current flowing in the thermo-control circuit to thereby control the fluid-heating circuit by switching on and off, and wherein the fluid tank has a metallic outer case to which the semiconductor device is secured in close contact so that the heat generated at the semiconductor device due to consumption of electric power is transferred to the heat-transfer fluid stored in the fluid tank via the metallic outer case.

9 Claims, 6 Drawing Sheets

TEMPERATURE ADJUSTING SYSTEM ADAPTED FOR USE IN AN ELECTRIC VEHICLE AND THE LIKE

BACKGROUND OF THE INVENTION

1. Field of the Invention

The present invention relates to a temperature adjusting system for an air-heating apparatus, and in particular to a temperature adjusting system adapted for use as an air heating system in an electric vehicle, hybrid car, and the like, having a heat-transfer fluid supply apparatus for supplying a heat-transfer fluid in circulation from a fluid tank to a heat radiator to heat the inside of the electric vehicle.

2. Description of the Prior Art

In a conventional temperature adjusting system adapted for an air-heating apparatus used in an electric vehicle and the like, since an electric vehicle has no gasoline engine, there has been employed a general room air-conditioner type as an air-heating apparatus, instead of utilizing heat obtained from the gasoline engine. In this conventional type, however, a problem has been encountered such that the room air-conditioner type apparatus includes an outdoor unit having a heat exchanger exposed to the outdoor air of which the temperature becomes to a degree of −5° C. at the surface portion thereof. Therefore, there are formed drops of water on the surface portion of the heat exchanger exposed to the cold outdoor air so that the drops of water are undesirably frozen in many cases. Accordingly, it is necessary to reversibly switch the air conditioner to dissolve the freezed drops of water formed on the heat exchanger of the outdoor unit.

Moreover, there may be another considerable disadvantage such that, whenever a front glass of the electric vehicle collects moisture due to getting out cold outdoor air, the air conditioner must be switched off.

Furthermore, since the room air-conditioner type apparatus requires a large space for location also having a large weight.

In order to solve these problems, the present inventors have made a study of developing a new temperature adjusting system utilizing a hot-fluid supply apparatus.

SUMMARY OF THE INVENTION

Therefore, the present invention has been developed in order to solve the above mentioned problems involved in the conventional temperature adjusting system and has an essential objective to provide an improved temperature adjusting system having a hot-fluid supply apparatus of a long life with high reliability capable of finely controlling temperature with reduction both in size and cost.

In order to attain this objective, the temperature adjusting system of the present invention is adapted for use as an air heating system in an electric vehicle and the like, having a heat-transfer fluid supply apparatus for supplying a heat-transfer fluid in circulation from a fluid tank to a heat radiator, wherein the heat-transfer fluid supply apparatus comprises: a thermo-control circuit having a thermo-control valve which is operative in response to variations in temperature of the heat-transfer fluid in the fluid tank under application of a low DC voltage supplied from a first DC voltage supply source serially connected thereto; a fluid-heating circuit having a second d.c. voltage supply source for supplying a high d.c. voltage to an electric heater serially connected thereto for heating the heat-transfer fluid stored in the fluid tank; and a switch control unit operatively associated with both the thermo-control circuit and the fluid-heating circuit, whereby the fluid-heating circuit is switched on and off in accordance with the operation of the thermo-control circuit.

The switch control unit comprises a semiconductor device which is operative by variations in electric current flowing in the thermo-control circuit to thereby control the fluid-heating circuit by switching on and off, where the fluid tank has a metallic outer case and the semiconductor device is securely fixed in close contact to the metallic outer case of the fluid tank so that the heat generated at the semiconductor device due to a consumption of electric power by the semiconductor device is transferred to the heat-transfer fluid stored in the fluid tank via the metallic outer case.

By this arrangement, since the semiconductor device has a long life, the operating times of adjusting temperature are not limited, thereby achieving fine control of the temperature with an reduction in size and cost of the apparatus.

Moreover, since the heat generated by the consumption of electric power at the semiconductor device is effectively transferred to the fluid to be heated via the metallic outer case of the tank, therefore the excessive rise in temperature of the semiconductor device can be prevented.

According to a feature of the present invention, the fluid in the metal outer case of the tank is heated by a heater supplied with high-voltage power by way of a semiconductor device to be switched on and off for adjusting the temperature of the fluid, and since the electric power supply to the heater is switched on and off by the semiconductor device, the frequency of the ON/OFF operations is not limited, and therefore the reliability of the apparatus can be improved with longer life.

Moreover, by frequently switching on and off the heating power supply via a semiconductor device, a fine control in temperature of the fluid can be effected with high accuracy.

In addition, since the outer case of the fluid tank is made of a metallic material, the heat generated due to electric consumption at the semiconductor device is transferred to the metallic outer case to be thereby effectively used to heat the fluid in the tank, together with cooling the semiconductor device, with a suppression of an excessive rise in temperature thereof.

According to another feature of the present invention, at least first and second semiconductor devices are serially connected in a switch control unit in a heating circuit for supplying electric power to a resistor of the heater, wherein the first semiconductor device is provided for controlling the temperature to be adjusted in a predetermined range and the second semiconductor device is provided for switching off the high voltage supply of the heating circuit for preventing the heater from being supplied with high excessive electric current.

By this arrangement, even if the function of controlling the temperature is not effected due to an accidental occurrence in the first semiconductor device, the excessive electric power supply can be cut off by the second semiconductor device, so that the reliability of the apparatus can be improved.

According to further another feature of the present invention, the first and second semiconductor devices are of different types from each other, wherein one type is for adjusting the temperature by frequently switching on and off and the other type is for cutting off the heating circuit in the abnormally excessive high temperature while being supplied with high electric current all the time in the normal condition in temperature. Thus, by adapting suitable semiconductor devices for the first and second types respectively, the cost of the apparatus can be remarkably reduced with improvement of reliability.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

Figure 1:
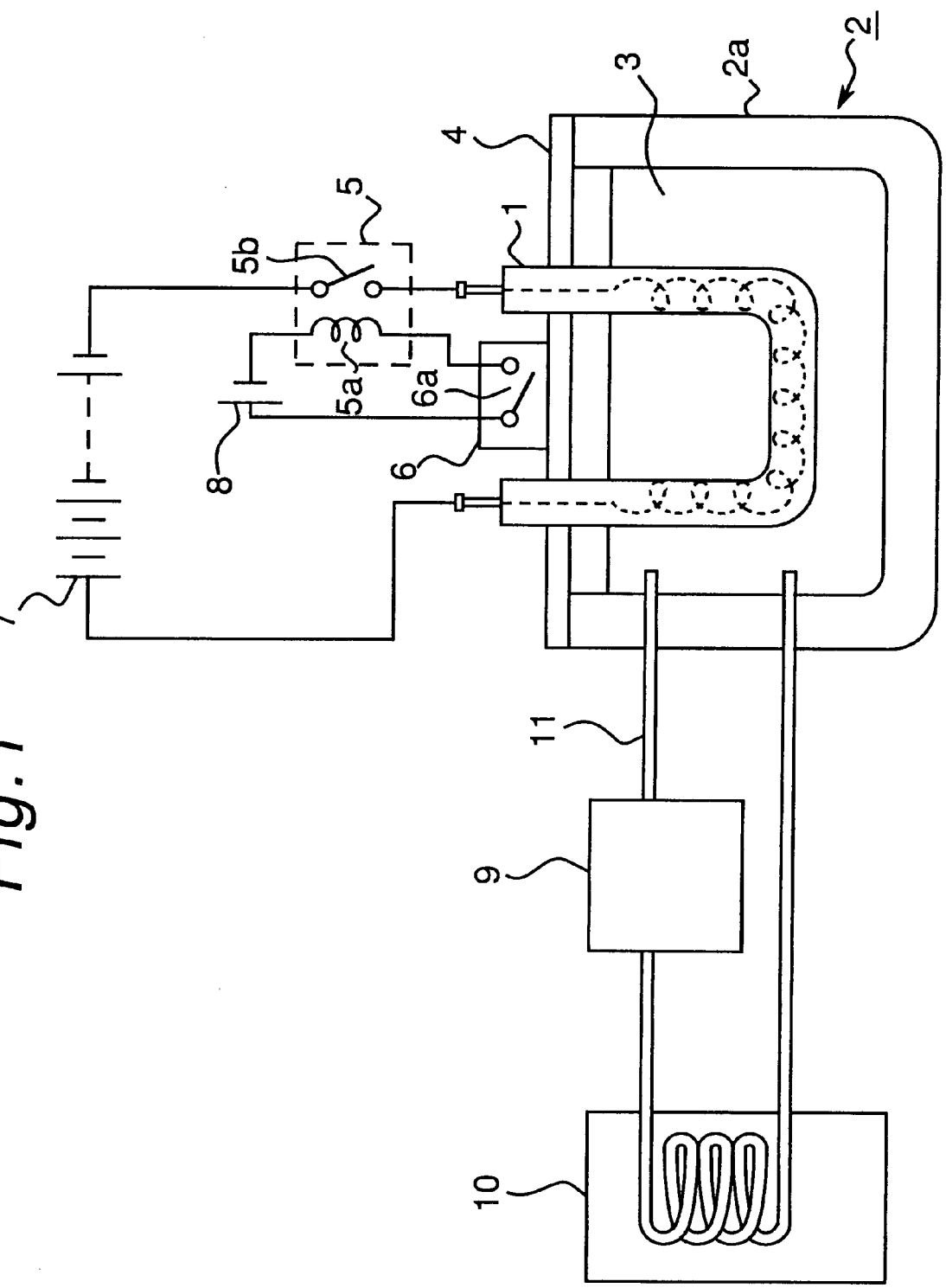
FIG. 1 is a schematic view showing a fundamental construction of a temperature adjusting system according to the present invention.

Before the description proceeds, it is noted here that, since the basic structures of the present embodiments are similar, like parts are designated by like reference numerals throughout the drawings.

In FIG. 1, an improvement of a temperature adjusting system for use in an electric vehicle according to the present invention has, for example, a hot-water supply apparatus which includes an electric heater 1 of a built-in tube type located in a fluid such as water or antifreeze liquid stored in a fluid tank or water tank 2. The water tank 2 has an outer case 2a and a lid portion 4 for sealing, where the water tank 2 is mechanically connected to a heat radiator 10 via a pipe 11 by way of a pump 9.

The hot-water supply apparatus further includes a temperature adjusting device having a thermo-control circuit and a water-heating circuit.

The thermo-control circuit is comprised of a thermostat 6 having a contact switch 6a, a low DC battery 8 supplying a low DC voltage of e.g. 12 volts and a relay 5 serving as a switch means. The relay 5 is adapted to an arc-connection and includes a coil 5a and a contact switch 5b to constitute an electromechanical device operated by variations in the input which, in turn, operate or control other devices connected to the output. The relay is generally associated with electrical circuitry, where the input may be electrical and output directly mechanical. Thus, the relay 5 also serves as an electrically isolating means between the water-heating circuit and the thermo-control circuit.

The water-heating circuit is comprised of a high-voltage battery 7 for supplying a high voltage of, for example, 300 volts to the heater 1 for heating the water and the contact switch 5b of the relay 5 which is serially connected between the high-voltage battery 7 and the heater 1 as shown in FIG. 1.

In this arrangement, when the water 3 is lower in temperature than a first given value of, for example, 77° C., the contact switch 6a of the thermostat 6 is set in a closed state (ON) so that a low DC voltage of, for example, 12 volts is supplied to the coil 5a of the relay 5 from the low DC battery 8 to generate a magnetic field around the coil 5a. Accordingly, the contact switch 5b of the relay 5 is closed (i.e., switched on) by the effect of the magnetic field and then the high DC current from the high-voltage battery 7 flows through the heater 1 to thereby heat the water 3 in the tank 2.

When the temperature of the water 3 is raised to or higher than a second given value of, for example, 80° C., the contact switch 6a of the thermostat 6 is set to be opened to switch off the thermo-control circuit to thereby cut off the low DC voltage supply of 12 volts from the battery 8 to the coil 5a of the relay 5. Thus, the contact switch 5b of the relay 5 is opened (i.e., switched off) to thereby cut off the high voltage supply from the high-voltage battery 7 to the heater 1 in the water-heating circuit, so that the operation of heating the water by the heater 1 is interrupted.

By continually repeating the mutual heating and interrupting operations mentioned above, the temperature of the water 3 in the tank 2 is adjusted to be maintained in the predetermined range. Then, the hot-water adjusted in temperature in the tank 2 is supplied to the heat radiator 10 via the pipe 11 by means of the pump 9. Thereafter, the cooled water 3 is fed back to the tank 2 to be heated again.

In this hot-water supply apparatus, however, since the water-heating circuit for supplying the high-voltage from the high-voltage battery 7 to the heater 1 is switched on and off to adjust the temperature of the water by utilizing the relay 5, the operating times of the apparatus are limited due to a short life of the contact switch 5b of the relay 5. Moreover, since the apparatus can not be operated with high frequency, it is difficult to finely control the temperature of the water with high accuracy.

First Embodiment

Figure 2:
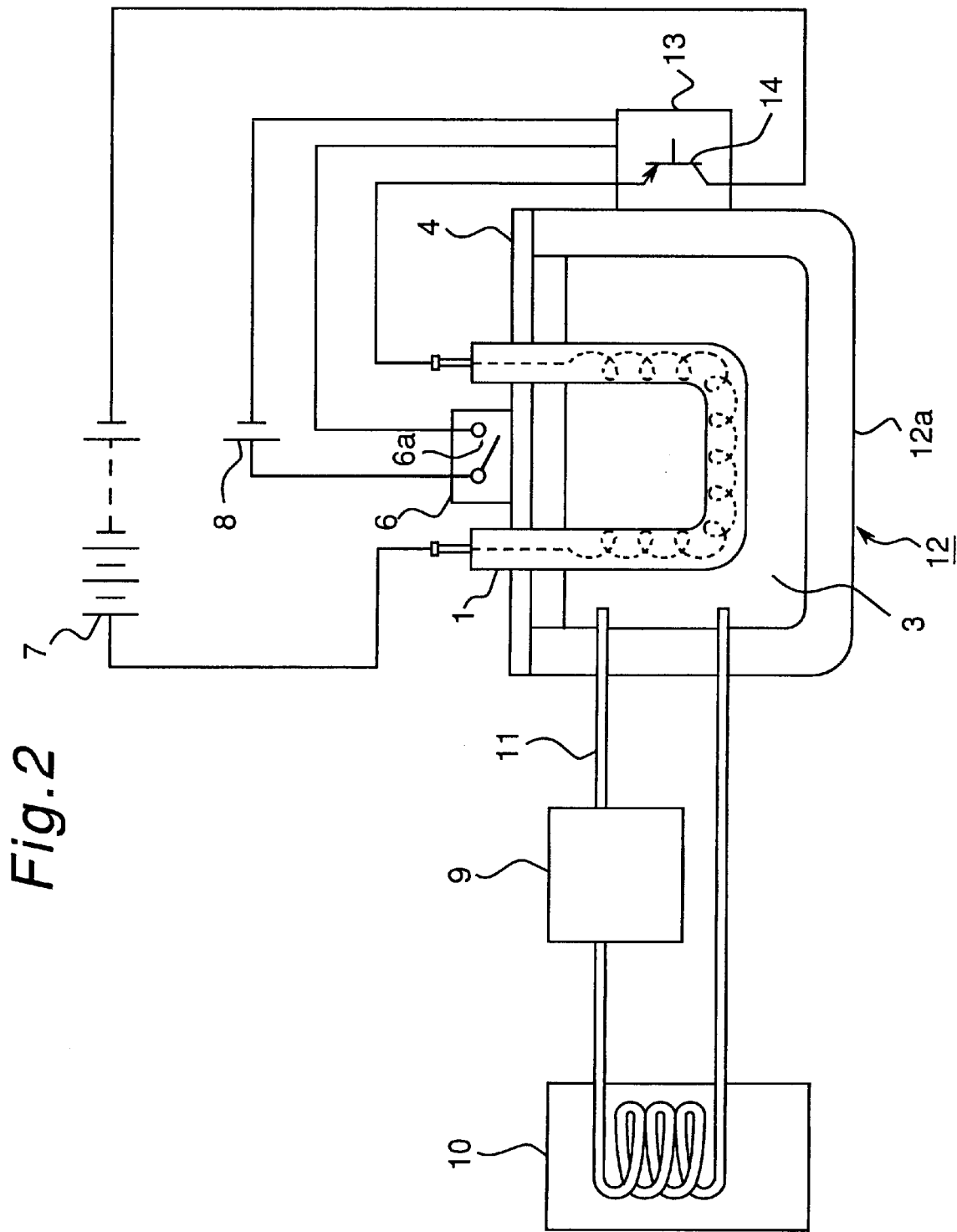
FIG. 2 is a schematic view showing a construction of a first embodiment of a temperature adjusting system according to the present invention.
Figure 3:
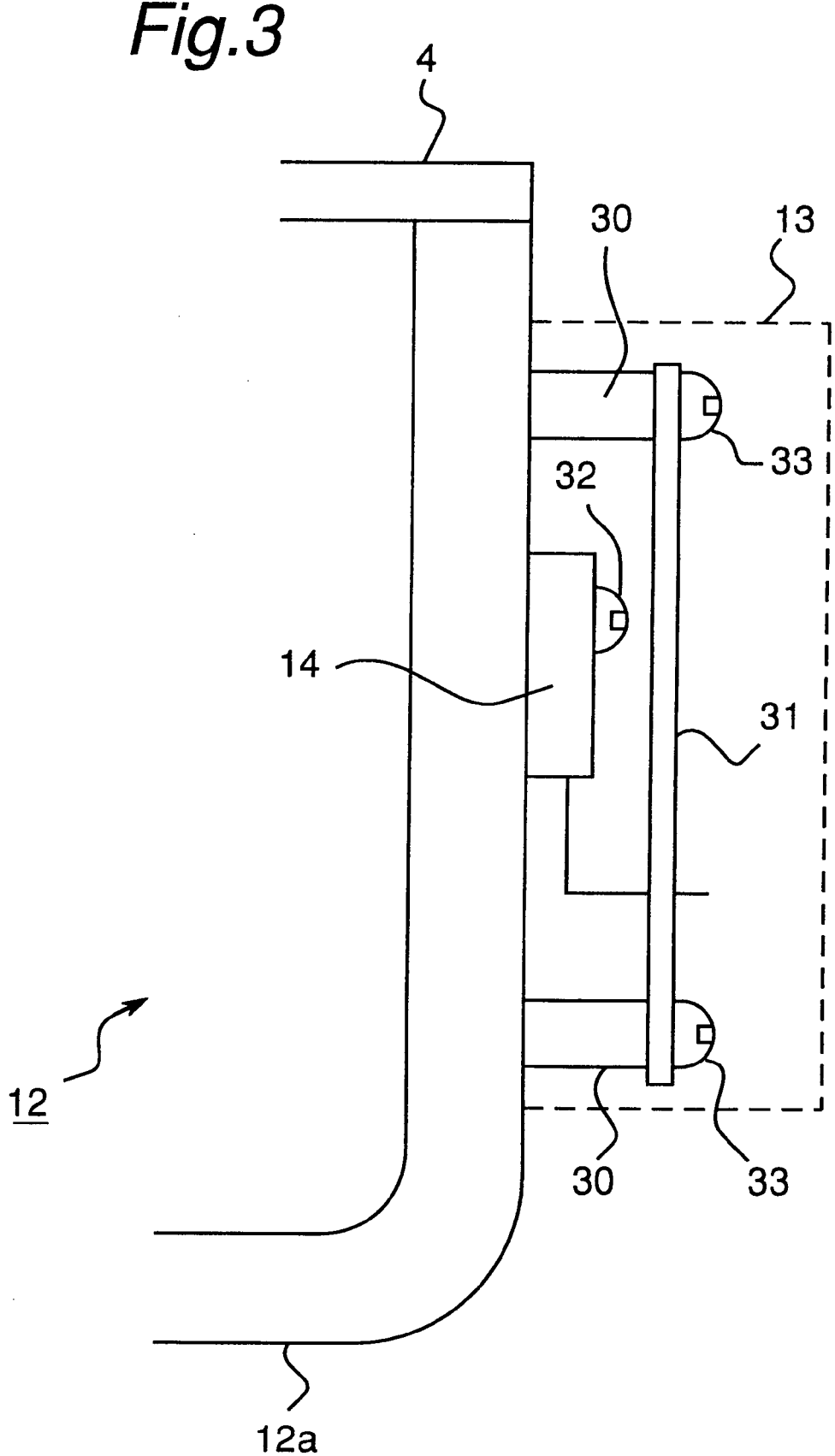
FIG. 3 is an enlarged schematic view showing a portion having a semiconductor device attached thereto according to the first embodiment of the present invention.
Figure 4:
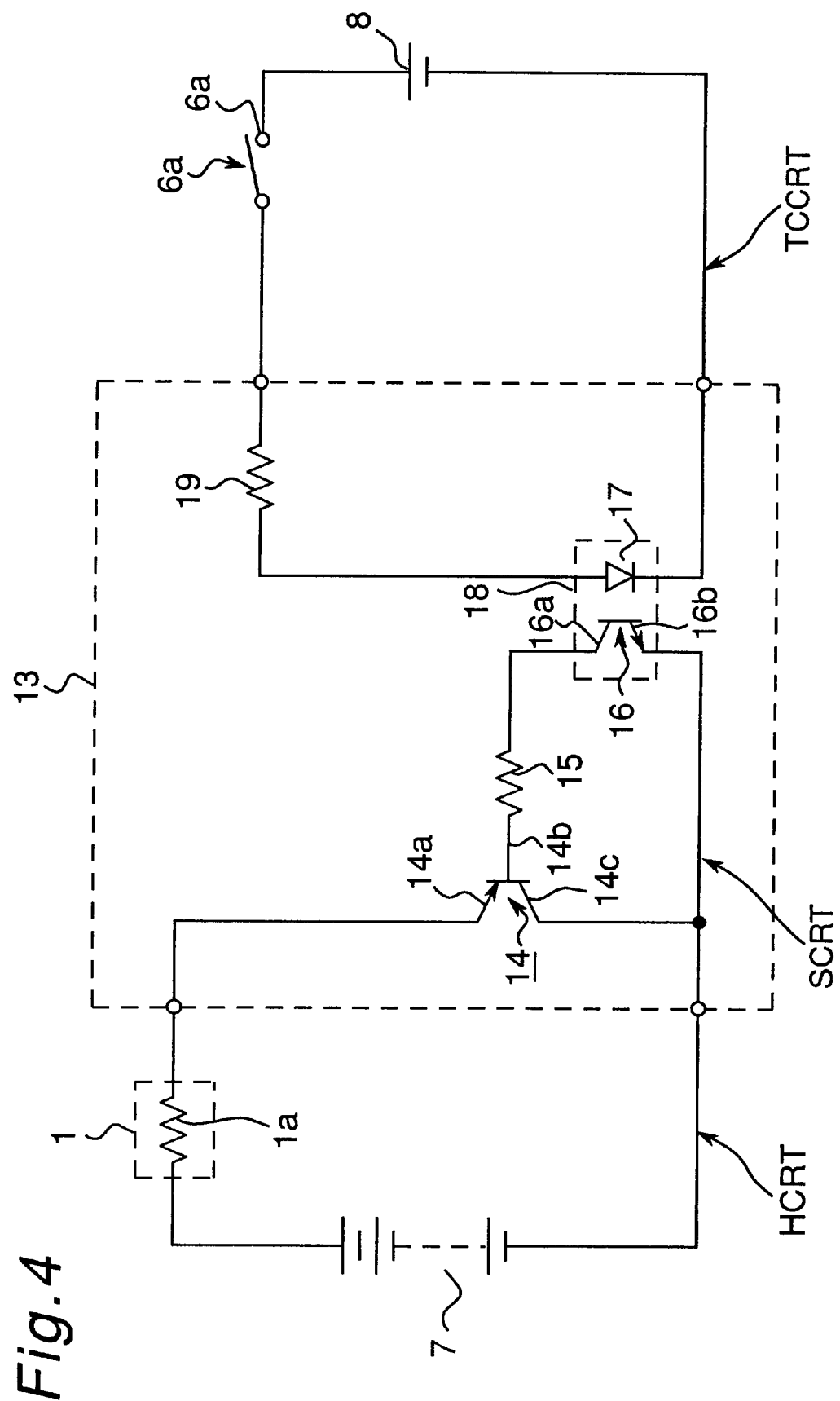
FIG. 4 is a circuit view showing a construction of a temperature adjusting device according to the first embodiment of the present invention.

The following describes a first embodiment of the present invention with reference to FIGS. 2 through 4.

In contrast to the above fundamental embodiment using a relay as a switching means, in order to increase the operating times of a switching means for the temperature adjusting system with high frequency and to obtain a long life of the switching means with reduction in size and cost thereof, a semiconductor device is preferably utilized instead of using a relay means.

In more detail, in the construction of the first embodiment shown in FIG. 2, the temperature adjusting system for an air-heating apparatus used in an electric vehicle and the like is constructed by providing, for example, an improved hot-water supply apparatus or the like fluid-supply apparatus. The hot-water supply apparatus includes an electric heater 1 having a resistor 1a and a water tank 12 for storing water 3 as a heat storage/transfer fluid medium. The water tank 12 has a metallic outer case 12a such as, for example, an aluminum die-cast case and a lid portion 4 for sealing the tank.

The hot-water supply apparatus has a temperature adjusting device for adjusting the temperature of the water in the tank 12 which the temperature adjusting device is comprised of a thermo-control circuit and a water-heating circuit as shown in FIG. 4.

The thermo-control circuit is comprised of a low-voltage battery 8 for supplying a low DC voltage of, for example, 12 volts and a thermostat 6 having a contact switch 6a used as a thermo-control valve which is serially connected to the battery 8 in the circuit, where the battery 8 and the thermostat 6 are both electrically connected in common to a control unit 13. The thermostat 6 is located at a position, for example, on the lid portion 4 or the like peripheral adjacent portion of the outer case to sensibly respond to the temperature of the water 3 in the tank.

It is noted here that, although a thermostat is used as a thermo-control valve means in this embodiment, other types of a temperature sensor means such as a thermistor or the like valve can be used.

The control unit 13 includes a transistor 14 as a semiconductor switch means having a rapid response property compared to a relay means, which the semiconductor device 14 is securely fixed in close contact to the outer case 12*a* of the water tank 12.

The water heating circuit is comprised of a high-voltage battery 7 for supplying high-voltage of, for example, 300 volts with DC current of about 10 amperes to the heater 1 for heating the water 3 in the tank 114 provided in theor 14 provided in the control unit 13 as a semiconductor switching means, where the transistor 14, the high-voltage battery 7 and the heater 1 are serially connected to each other in the water heating circuit.

In more detail, in the construction of the temperature adjusting device as shown in FIG. 4, the control unit 13 further includes a-photo-coupler 18 and a switching circuit for switching on and off the water heating circuit.

The photo-coupler generally has a construction such that a light-emitting diode as a light-emitting element and a photo-transistor paired thereto as a light-receiving element are enclosed in combination in a package. The photo-transistor may be a semiconductor device with electrical characteristics that are light-sensitive, where primary photoelectric current is multiplied internally in the device, thus increasing the sensitivity to light.

In this preferred embodiment, there is used a type of photo-transistor which is provided with a base lead which the lead enables the photo-transistor to be used as a switching device. Thus, the application of a small amount of light causes the device to switch from a low current to a high current condition.

The light-emitting diode may be a rectifying semiconductor device which converts electric energy into electromagnetic radiation light, which the wavelength of the emitted radiation ranges from the green to the near infrared, that is, from about 550 to over 1300 nanometers. Most commercial light-emitting diodes both visible and infrared, are fabricated from group III–V compounds. The most commonly used light-emitting diode is, for example, a red light-emitting diode, made of gallium arsenide-phosphide on gallium arsenide substrates.

In this embodiment, the photo-coupler 18 is comprised of, for example, a light emitting diode (referred to as "LED" hereinafter) 17 and a photo-transistor 16, where the LED 17 is serially connected to the thermostat 6 via a resistor 19 in the thermo-control circuit.

The switching circuit is comprised of the transistor 14 and the photo-transistor 16, where the photo-transistor 16 has a collector lead 16*a* serially connected to the base 14*b* of the transistor 14 via a resistor 15 and has an emitter lead 16*b* directly connected to the collector 14*c* of the transistor 14, where the base 14*b* of the transistor 14 constitutes an ohmic contact while the emitter 14*a* of the transistor 14 is serially connected to the resistor 1*a* of the heater 1.

In this arrangement, the following describes an operation of the temperature adjusting system of the first embodiment.

When the temperature of the water 3 in the tank 12 is lower than a first predetermined value of, for example, 77° C., the contact switch 6*a* of the thermostat 6 is set in a closed state (ON) so that a low DC voltage of, for example, 12 volts is supplied to the LED 17 from the low-voltage battery 8. Accordingly, electric current flows through the LED 17 via the resistor 19 in the thermo-control circuit. By this application of the forward bias voltage to the LED 17, the LED 17 emits light due to injection emission which the emission light is then received by the photo-transistor 16 paired to the LED 17 in the photo-coupler 18, so that the photo-transistor 16 is electrically turned on.

Thus, photo-electric current flows through the photo-transistor 16 from the base electrode 14*b* of the transistor 14 via the resistor 15, that is, the base current of the transistor 14 is produced. By producing the base current flowing through the base 14*b*, the transistor 14 is switched on and a high DC current in a degree of, for example, 10 amperes (A) flows through the heater resistor 1*a* from the high-voltage battery 7 to thereby heat the water 3 in the tank 12 under application of a high DC voltage of, for example, 300 volts supplied by the high-voltage battery 7.

When the temperature of the water 3 in the tank 2 is raised to a second predetermined value of, for example, 80° C. or higher, the contact switch 6*a* of the thermostat 6 is opened to switch off the thermo-control circuit to thereby interrupt the supply of the low DC voltage from the battery 8 to the LED 17 of the photo coupler 18, and therefore the low DC current flowing through the LED 17 is cut off. Thus, the photo-transistor 16 in the photo-coupler 18 is switched off and the transistor 14 is accordingly switched off. Then, the high voltage supply from the high-voltage battery 7 to the heater 1 is cut off, so that the heating of the water by the heater 1 is interrupted.

By continually repeating the mutual heating and interrupting operations by switching on and off the water-heating circuit in response to the temperature of the water 3 in the tank 12 sensed by the thermostat as mentioned above, the temperature of the water 3 is adjusted to be maintained at a substantially constant level. Then, the hot-water adjusted in temperature in the tank 12 is supplied to the heat radiator 10 via the pipe 11 by means of the pump 9 and the heat of the water is used for air-heating conditioner inside the electric vehicle. Then, the cooled water 3 in the heat radiator 10 is fed back to the tank 12 to be heated again.

In this arrangement, when the transistor 14 is being switched on, the consumption amount of electric power by the transistor 14 is 20 watts assuming that the transistor 14 has an on-saturation voltage of 2 volts under application of the electric current of 10 amperes flowing therethrough. That is, according to Joule's law, the quantitative relationship between the quantity of heat produced in a conductor and an electric current flowing therethrough is stated as $H=RI^2$, where H is rate of evolution of heat in watts, the unit of heat being the joule, R is resistance in ohms, and I is current in amperes. In such a case where the consumption power amounts to 20 watts, it is necessary to provide another heat radiator for discharging the heat generated by the transistor 14.

In the preferred embodiment of the present invention, it becomes possible to omit such another heat radiator by a specific feature as to be described below.

That is, in the construction shown in FIG. 3, the transistor 14 is fixed in close contact to the metallic outer case 12*a* such as an aluminum die-cast case by means of, for example, a fastening screw 32 or the like clamping means, so that the heat generated due to consumption of the electric power at the transistor 14 is discharged through the metallic outer case 12*a* and transferred to the water 3. Thus, the hot-water supply apparatus can be made without providing such another heat radiator. Moreover, in this construction, the heat generated by the transistor 14 is utilized for heating the water 3 in the tank 12, thus allowing to effectively use the electric power consumed by the transistor 14.

The other circuit components than the transistor 14 in the control unit 13 are electrically connected by providing a printed circuit board 31 which is securely fixed to the metallic outer case 12a by means of fastening screws 33 or the like clamping means and located above the transistor 14 with a spacer member 30 for isolation from the metallic outer case 12a. As an example of the transistor 14, there may be used a general transistor having a voltage-proof property in a degree of 500 volts with electric current of 20 amperes flowing therethrough.

Accordingly, in the construction of the first embodiment, since the transistor closely attached to the metallic outer case of the tank is used for switching on and off the water heating circuit instead of using a relay, the power consumption by the transistor can be effectively used and the long life of the hot-water supply apparatus can be attained with a reduction in cost.

Moreover, since the transistor 14 for transmission of electric power is used as a semiconductor switch means having a rapid response property compared to a relay means in the water heating circuit, the temperature adjustment is limited not only to a common on/off switching means for transmission of electric power but also may be developed to be utilized for duty control and "A" class operation of the transistor.

In this embodiment, it is noted here that, although the water and the hot-water tank are used as a heat storage/transfer fluid medium, other fluid such as, for example, antifreeze mixture liquid and fluid-storage tank may be used. As a substance for antifreeze mixture, materials added to the water in a cooling systems of internal combustion engines, refrigeration brine, aqueous hydraulic fluids, and the like heat-transfer fluids may be used. Moreover, as a heating power switching semiconductor device, MOS and the like transistor may be used other than the general transistor.

Furthermore, although an aluminum die-cast case is used as a metallic outer case 12a, other metal cases such as a copper or the like one may be used.

It is also noted here that, although a thermostat is used as a thermo-control valve in this embodiment, other types of temperature sensors such as a thermistor or the like thermo-control valve can be used.

Second Embodiment

Figure 5:
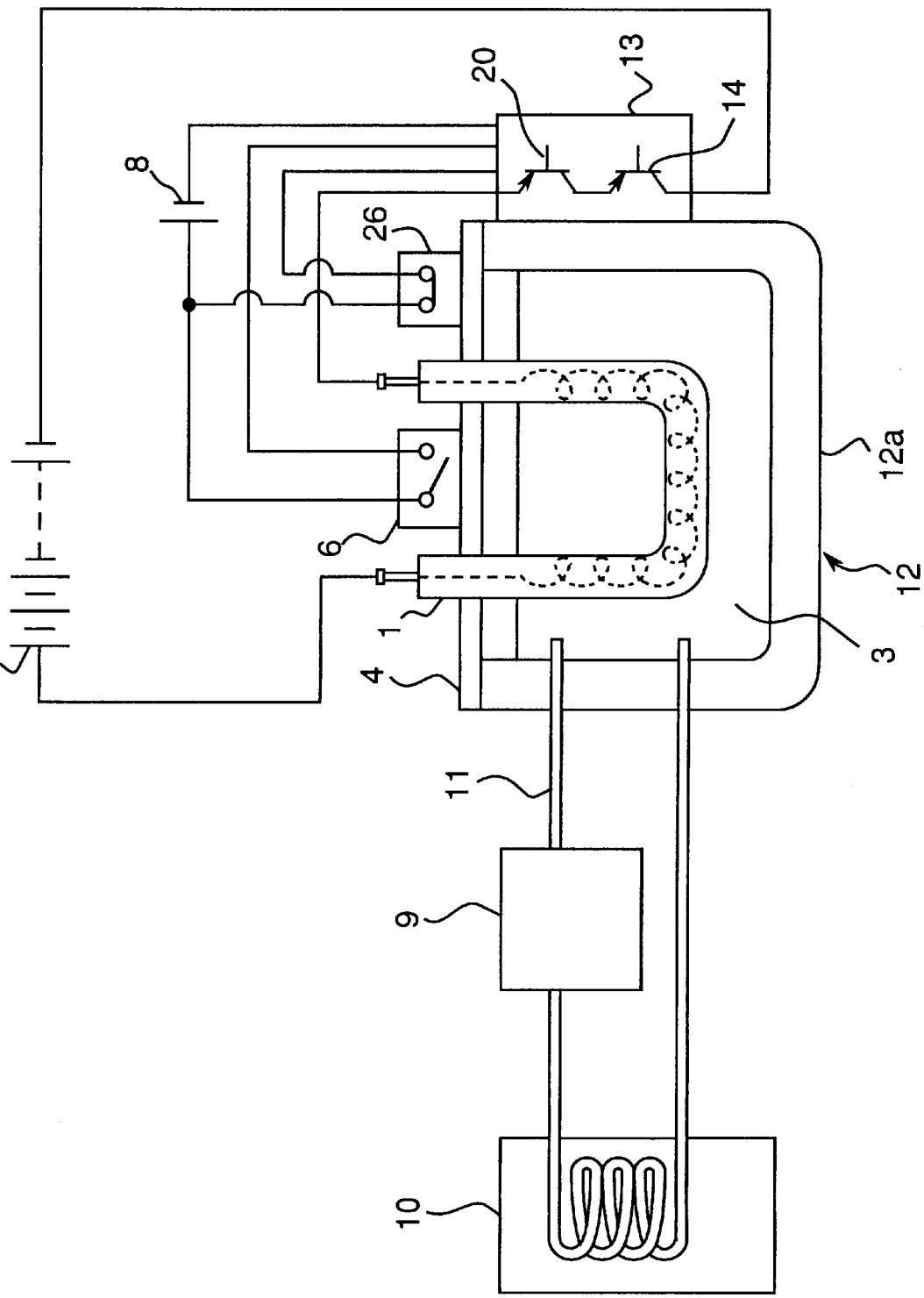
FIG. 5 is a schematic view showing a construction of a second embodiment of a temperature adjusting system according to the present invention.
Figure 6:
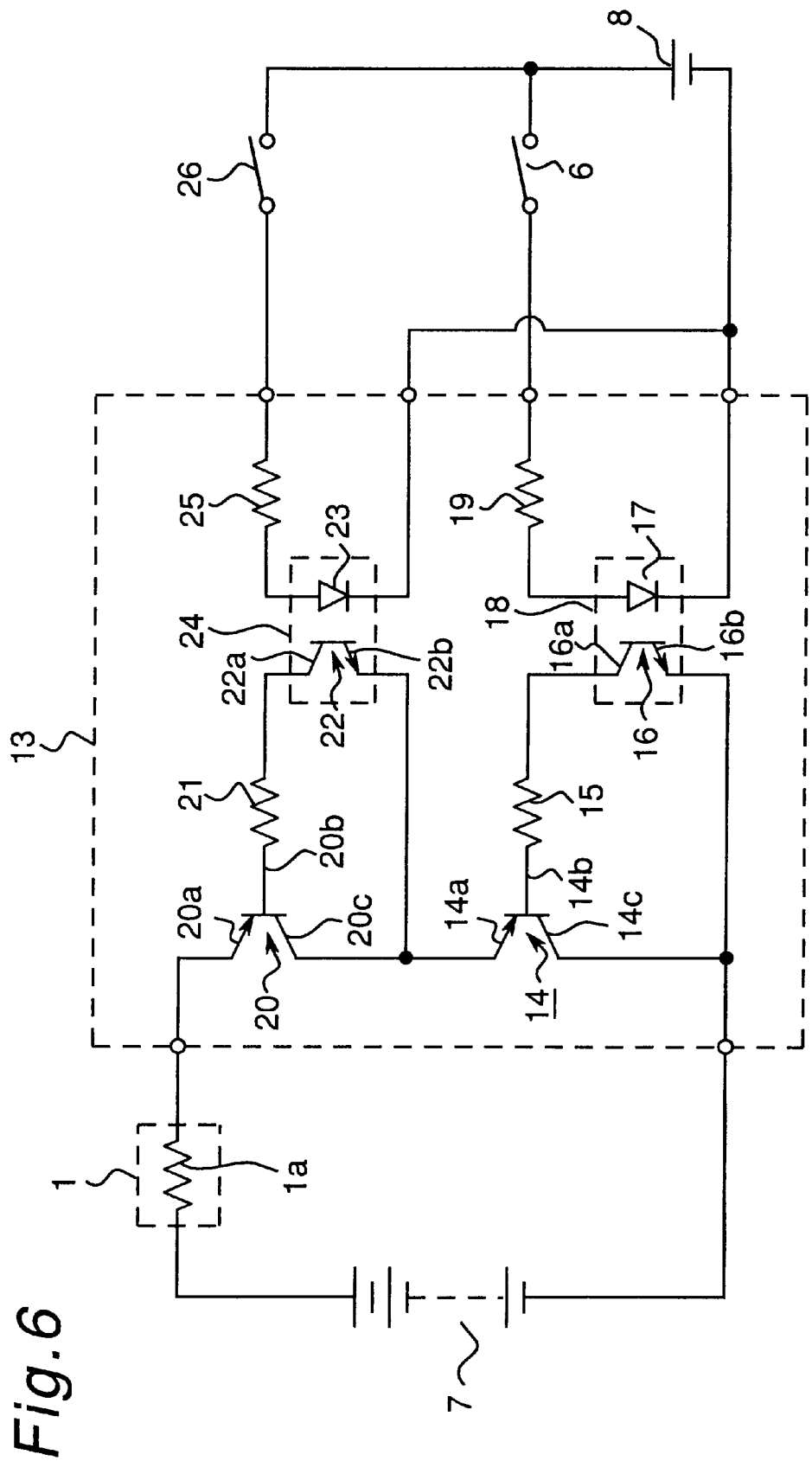
FIG. 6 is a circuit view showing a construction of a temperature adjusting device according to the second embodiment of the present invention.

The following describes a second embodiment of the temperature adjusting system of the present invention with reference to FIGS. 5 and 6.

In the construction shown in FIG. 5, comparing to that of the first embodiment, the difference in feature resides in that a plurality of thermo-control circuits are provided. In this second embodiment, explanation is made in the case of having, for example, two thermo-control circuits, where a second thermostat 26 is further provided in parallel to the first thermostat 6 in the first thermo-control circuit, and a second transistor 20 associated with the second thermostat 26 in the second thermo-control circuit is further provided, which the second transistor 20 is serially connected to the first transistor 14 in the control unit 13.

Accordingly, in a circuit arrangement of a temperature adjusting device shown in FIG. 6, a second photo-coupler 24 is further provided in association with the second transistor 20 along with the second thermostat 26 in addition to the first photo-coupler 18 in the control unit 13. In this arrangement, the construction and operation of the first photo-coupler 18 in association with the first transistor 14 are the same as those of the first embodiment, and therefore the redundant explanation thereof is omitted here.

The second photo-coupler 24 is comprised of a LED 23 paired with a photo-transistor 22 in a similar manner to that of the first photo-coupler 18, where the LED 23 is serially connected to the thermostat 26 via a resistor 25.

The second thermostat 26 is serially connected to the low-voltage battery 8 to thereby constitute a second thermo-control circuit serving as a cut-off circuit for preventing occurrence of an overheating condition. The thermostat 26 is normally set to be in a closed ("ON") condition within a third given level of, for example, 85° C. which is set to higher than the second given level of, for example, 80° C., while the thermostat 26 is set to be opened ("OFF") when the temperature of the water is raised to the third given level or higher, i.e., in the abnormal condition.

The second transistor 20 is serially connected to the photo-transistor 22 via a resistor 21 to form a second switching circuit, where the photo-transistor 22 has a collector lead 22a serially connected to a base 20b of the second transistor 20 via the resistor 21 and has an emitter lead 22b directly connected to the collector 20c of the transistor 20, where the base 20b of the transistor 20 constitutes an ohmic contact while the emitter 20a of the transistor 20 is serially connected to the resistor 1a of the heater 1.

In this arrangement, when the temperature of the water 3 in the tank 12 is within the third given level of, for example, 85° C., i.e., in the normal condition, the contact switch 26a of the second thermostat 26 is normally set in the closed state (ON) so that a low DC voltage of, for example, 12 volts is supplied to the LED 23 from the low-voltage battery 8. Accordingly, electric current flows through the LED 23 via the resistor 25 in the second thermo-control circuit.

By this application of the forward bias voltage to the LED 23, the LED 23 emits light due to injection emission which the emission light is received by the photo-transistor 22 paired to the LED 23 in the second photo-coupler 24, so that the photo-transistor 22 is normally maintained to be turned on. Thus, photo-electric current flows through the photo-transistor 22 from the base electrode 20b of the second transistor 20 via the resistor 21. By causing the base current to flow through the base 20b, the second transistor 20 is normally in the "ON" condition.

Therefore, in the normal condition, when the temperature of the water 3 is below than the first given level of, for example, 77° C., the first thermostat 6 is also switched on and the first transistor 14 is also switched on, a high DC current in a degree of, for example, 10 amperes (A) flows the heater resistor 1a from the high-voltage battery 7 through the first and second transistors 14 and 20 to thereby heat the water 3 in the tank 12 under application of a high DC voltage of, for example, 300 volts supplied by the high-voltage battery 7.

When the temperature of the water 3 is raised higher than the first predetermined value and to the second given value or higher in the normal condition, the contact switch 6a of the first thermostat 6 is opened to switch off the thermo-control circuit to thereby interrupt the supply of the low DC voltage from the battery 8 to the LED 17 of the first photo coupler 18, and therefore the low DC current flowing through the LED 17 is cut off as described in the first embodiment.

However, there may be an abnormal case where the contact switch 6a of the thermostat 6 is not opened and does not switch off the thermo-control circuit in accidentally or other reasons even when the temperature of the water 3 is raised higher than the second predetermined value.

Even in such an abnormal case, when the temperature of the water 3 is raised higher than the second predetermined value and reaches to the third predetermined level, the contact switch 26a of the second thermostat 26 is opened to switch off the second thermo-control circuit to thereby interrupt the supply of the low DC voltage from the battery 8 to the LED 23 of the second photo coupler 24, and therefore the low DC current flowing through the LED 23 is cut off. Thus, the photo-transistor 22 in the photo-coupler 24 is switched off and the transistor 20 is accordingly switched off. Then, the high voltage supply from the high-voltage battery 7 to the heater 1 is cut off, so that the overheating of the water by the heater 1 is securely prevented.

Thus, in the construction of the second embodiment, even if a function of the first thermo-control circuit in association with the first photo-coupler 18 along with the first transistor 14 is damaged accidentally and remains in the "ON" condition even when the temperature of the water is higher than the second predetermined value, the overheating of the water can be effectively prevented by switching off the second transistor 20 when the temperature of the water is raised to the third given level, thus improving the reliability of the apparatus with reduction of the cost thereof compared to that of using two relays.

The present invention is not limited to the embodiments mentioned above, but various modifications thereof are possible. For example, in the second embodiment, there may be used an additional circuit for maintaining the "OFF" condition once the second transistor 20 is switched off for increasing the reliability of the apparatus.

Moreover, although the first and second transistors 14 and 20 are used in the first and second switching circuits, respectively, a semiconductor device suitable for a transistor having a high voltage/current proof property is preferably used as the first transistor 14 which is frequently switched on and off, while another type semiconductor device suitable for MOS having a small power consumption requiring no base current is preferably used as the second transistor 20 which is normally switched on, thereby allowing to improve the reliability of the apparatus with a further reduction in cost.

As is clearly seen from the above-mentioned description, since the temperature adjusting system of the present invention has a hot-fluid supply apparatus instead of using a general room air-conditioner type apparatus, it becomes possible to solve the problem of formation of frozen drops of water on the heat exchanger, with reduction both in size and weight.

According to the aspect of the first embodiment, since the temperature adjusting system of the present invention is provided with a semiconductor device for switching on and off the fluid heating circuit, the frequency of the on/off switching operation is not limited, allowing to finely adjust the temperature in accuracy, improving the reliability with obtaining a longer life of the apparatus.

In addition, the present invention has various advantages such that, in the present invention, since the semiconductor device provided in the fluid heating circuit is fixed in close contact to the metallic outer case of the fluid tank, the heat generated due to the consumption of electric power at the semiconductor device is transferred to the water in the tank via the metallic outer case. Thus, the heat generated by the semiconductor device can be effectively used to heat the water, thereby effectively utilizing the electric power supplied to the semiconductor device, and avoiding the overheating of the semiconductor.

Moreover, since the transistor 14 for transmission of electric power is used as a semiconductor switch means having a rapid response property in the fluid heating circuit, the temperature adjustment is not limited to a common on/off switching means for transmission of electric power but also may be developed to be utilized for duty control and "A" class operation of the transistor.

Moreover, in the construction of the second embodiment, even if a function of the first thermo-control circuit in association with the first photo-coupler along with the first transistor is damaged accidentally and remains in the "ON" condition even when the temperature of the water is higher than the second predetermined value, the overheating of the water can be effectively prevented by switching off the second transistor 20 when the temperature of the water is beyond the third given level, thus improving the reliability of the apparatus with reduction of the cost thereof compared to the case using two relays.

Furthermore, according to the present invention, a semiconductor device suitable for a transistor having a high voltage/current proof property is used as the first transistor (14) which is frequently switched on and off while another semiconductor device suitable for MOS having a small power consumption and requiring no base current is used as the second transistor (20) which is normally switched on, thereby allowing an improvement in the reliability with a reduction of the cost.

Although the present invention has been fully described by way of example with reference to the accompanying drawings, it is to be noted here that various changes and modifications will be apparent to those skilled in the art. Therefore, unless such changes and modifications depart from the scope of the present invention as defined by the appended claims, they should be construed as being included therein.

What is claimed is:

1. A temperature adjusting system adapted for use as an air heating system in an electric vehicle, said temperature adjusting system comprising:

a heat-transfer fluid supply apparatus for supplying a heat-transfer fluid in circulation from a fluid tank to a heat radiator, said heat-transfer fluid supply apparatus comprising:

a thermo-control circuit comprising a thermo-control valve and a first DC voltage supply source, wherein said thermo-control valve is operatively responsive to temperature variations of the heat-transfer fluid in the fluid tank under application of a low DC voltage supplied from said first DC voltage supply source which is serially connected to said thermo-control valve;

a fluid-heating circuit comprising a second DC voltage supply source for supplying a high DC voltage to an electric heater serially connected to said second DC voltage supply source for heating the heat-transfer fluid stored in the fluid tank; and a switch control unit, operatively connected with said thermo-control circuit and said fluid-heating circuit, comprising a semiconductor device which is operative in accordance with variations in electric current flowing in said thermo-control circuit to thereby control said fluid-heating circuit by switching on and off;

wherein said fluid-heating circuit is switched on and off in accordance with an operation of said thermo-control circuit;

wherein the fluid tank has a metallic outer case and said semiconductor device is secured in close contact to the metallic outer case of the fluid tank so that the heat generated at said semiconductor device due to consumption of electric power by said semiconductor device is transferred to the heat-transfer fluid stored in the fluid tank via the metallic outer case.

2. The temperature adjusting system as claimed in claim 1, wherein said switch control unit serves as an electrical isolating means between said fluid-heating circuit and said thermo-control circuit.

3. The temperature adjusting system as claimed in claim 1, wherein said electric heater is of a built-in tube type which is sunk in the heat-transfer fluid stored in the fluid tank which is mechanically connected to the heat radiator via a pipe by way of a pump.

4. The temperature adjusting system as claimed in claim 1, wherein said switch control unit includes a photo-coupler which is comprised of a light-emitting diode and a photo-transistor paired thereto and enclosed in combination in a package, and wherein the light-emitting diode is serially connected to said thermo-control valve in said thermo-control circuit while said photo-transistor is electrically connected to said semiconductor device in said fluid-heating circuit.

5. The temperature adjusting system as claimed in claim 1, wherein said semiconductor device provided in said switch control unit is a general MOS transistor having a voltage-proof property.

6. The temperature adjusting system as claimed in claim 1, wherein said thermo-control valve is comprised of a first thermostat which is set in a closed state to switch on said thermo-control circuit when a temperature of the heat-transfer fluid in the fluid tank is lower than a first given value and which is set in an opened state to switch off said thermo-control circuit when the temperature of the heat-transfer fluid in the fluid tank is raised to a second given value which is higher than the first given value.

7. The temperature adjusting system as claimed in claim 4, further comprising a second thermo-control circuit serving as a power supply cut-off circuit including a second thermostat which is serially connected to said first DC voltage supply source, wherein said second thermostat is normally set to be in a closed condition when the temperature of the heat-transfer fluid is within a third given level of the heat-transfer fluid which is higher than the second given value while said second thermostat is set to be opened when the temperature of the heat-transfer fluid is raised to the third given level in an abnormal condition.

8. The temperature adjusting system as claimed in claim 7, wherein said switch control unit further comprises a second semiconductor device serially connected to said first semiconductor device wherein said second semiconductor device is operative in accordance with variations in electric current flowing in said second thermo-control circuit.

9. The temperature adjusting system as claimed in claim 1, wherein the heat-transfer fluid is an antifreeze liquid.

* * * * *